United States Patent
Bi et al.

(10) Patent No.: US 12,547,529 B1
(45) Date of Patent: Feb. 10, 2026

(54) GENERATION OF STANDARDIZED TEST CASE INFORMATION USING GRAPH-BASED METHODS

(71) Applicant: Zoom Video Communications, Inc., San Jose, CA (US)

(72) Inventors: Dezhi Bi, Hangzhou (CN); Jianglong Cao, Hangzhou (CN); Yalin Chen, Hangzhou (CN); Zhongqiang Gao, Hangzhou (CN); Zhipeng Xu, Hangzhou (CN); Haisong Yan, Hangzhou (CN); Aimin Zhu, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 211 days.

(21) Appl. No.: 18/416,381

(22) Filed: Jan. 18, 2024

(51) Int. Cl.
 G06F 11/3668 (2025.01)
 G06F 11/3698 (2025.01)

(52) U.S. Cl.
 CPC ...... G06F 11/3684 (2013.01); G06F 11/3698 (2025.01)

(58) Field of Classification Search
 None
 See application file for complete search history.

(56) References Cited

U.S. PATENT DOCUMENTS

| | | | |
|---|---|---|---|
| 2008/0189094 A1* | 8/2008 | Adir | G06F 11/3684 703/14 |
| 2012/0246621 A1* | 9/2012 | Mukkavilli | G06F 11/3684 717/126 |
| 2021/0374040 A1* | 12/2021 | Kumar | G06F 11/3688 |
| 2023/0251960 A1* | 8/2023 | Sharma | G06N 5/04 717/124 |
| 2024/0330156 A1* | 10/2024 | Silverstein | G06F 11/3672 |
| 2025/0097471 A1* | 3/2025 | Rathi | H04N 19/46 |

OTHER PUBLICATIONS

Sagi et al., "Application of combinatorial tests in video game testing," Taylor & Francis, 2017. (Year: 2017).*

(Continued)

*Primary Examiner* — Ryan D. Coyer
(74) *Attorney, Agent, or Firm* — Kilpatrick Townsend & Stockton, LLP

(57) ABSTRACT

Techniques for generation of standardized test case information using graph-based methods are disclosed. In an example method, a computing device receives, from a graphical user interface (GUI), a test case specification, including a graph with a number of nodes, in which at least one pair of nodes are connected by an edge. The computing device receives, from the GUI, a designation of a node as a test case node, preconditions associated with the test case node, and step-expectation maps associated with the test case node. The computing device generates standardized test case information including the test case specification, the preconditions, and the step-expectation maps. The standardized test case information includes a data structure, based on a test case specification standard, that includes a representation of the test case specification and an image of the test case specification. The computing device outputs the standardized test case information.

20 Claims, 10 Drawing Sheets

(56) References Cited

OTHER PUBLICATIONS

Skowronek et al., "Quality of Experience in Telemeetings and Videoconferencing: A Comprehensive Survey," IEEE, 2022. (Year: 2022).*
Wang et al., "Automatic selection of test execution plans from a Video Conferencing System Product Line," ACM, 2012. (Year: 2012).*
"GitHub", fex-team/kityminder-core; retrieved from internet on Jan. 18, 2024 from: https://github.com/fex-team/kityminder-core, 4 pages.
"GitHub", didi/AgileTC; retrieved from internet on Jan. 18, 2024, from: https://github.com/didi/AgileTC, 5 pages.

* cited by examiner

GENERATION OF STANDARDIZED TEST CASE INFORMATION USING GRAPH-BASED METHODS

FIELD

The present application generally relates to automated software testing, and more particularly relates to techniques for generation of standardized test case information using graph-based methods.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
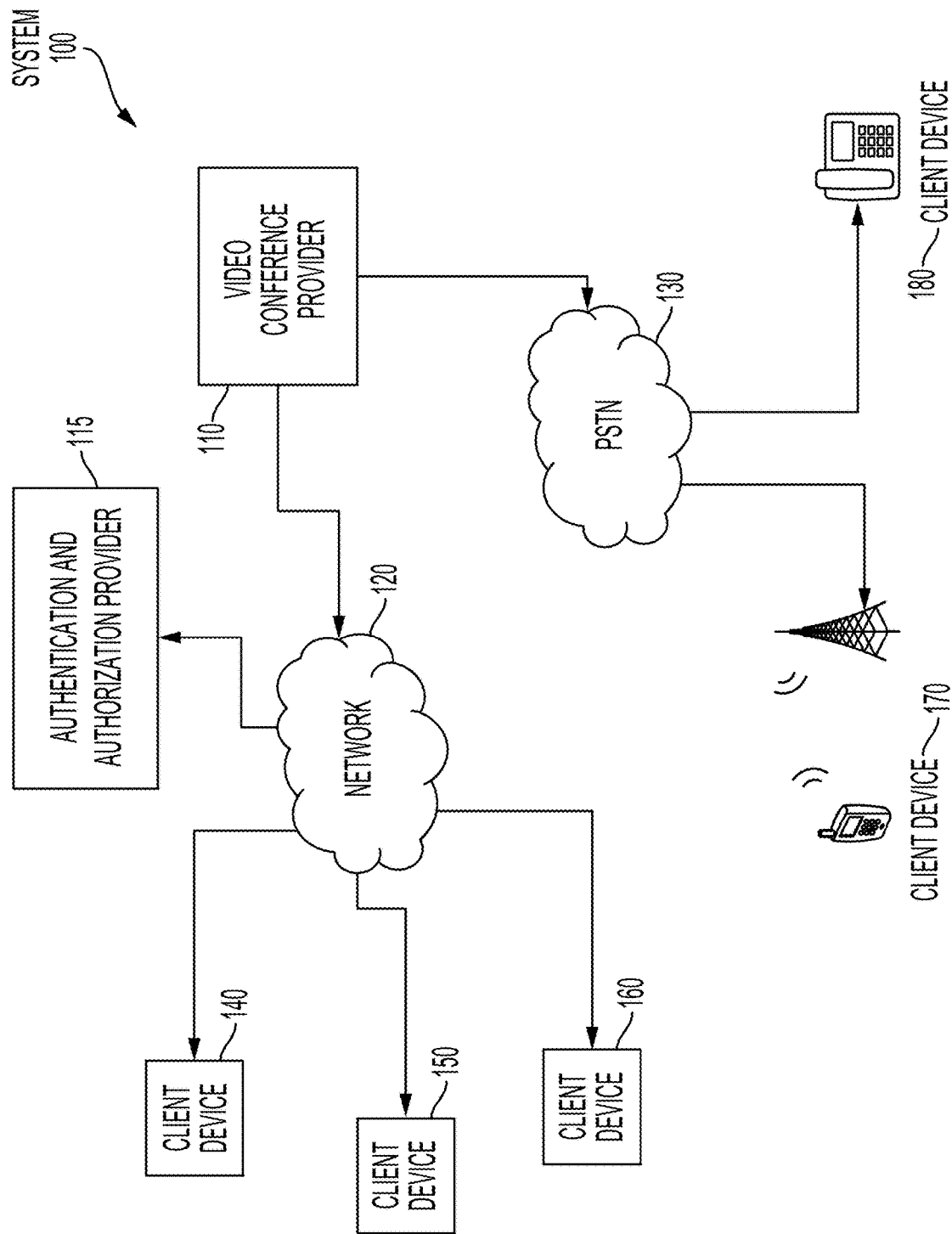
FIG. 1 shows an example system that provides videoconferencing functionality to various client devices, according to some aspects of the present disclosure.

Examples are described herein in the context of techniques for generation of standardized test case information using graph-based methods. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Robust video conferencing platforms are by now pillars of the communications backbone of the modern Internet. Such robustness and reliability come at price, however. Specifically, building and maintaining robust video conferencing platforms involves complex software that must be continuously and thoroughly tested.

A typical testing scenario involves both a client device and a server. The client device sends and receives data from the server via one of many application programming interface (API) endpoints, such as Hypertext Transfer Protocol (HTTP) endpoints associated with a web-based API. Web-based APIs may be complex, including hundreds or more endpoints, the endpoints themselves each including hundreds or even more possible parameters and configurations.

Authoring of a comprehensive test suite for such APIs can be a formidable task requiring careful and arduous manual planning. The tools available for such planning such as text, spreadsheets, code comments, etc. may be inadequate for the volume of planning required. For example, test cases can be overlooked or certain small, but critical variations may be missed. Additionally, such manual tools and methods lack uniform facilities for identification of common test case elements such as type test, test priority, security requirements, and so on. Existing methods may be difficult to read or visualize, increasing the difficulty level or potential error rate for test developers new to a code base.

These and other challenges can be addressed using techniques for generation of standardized test case information using graph-based methods. For example, a graphical user interface (GUI) can be used to input a graph-based test case specification that represents a particular test case. Such graphs are sometimes referred to as "mind maps." The test case specification may include elements such as edges, nodes, and labels or tags that correspond to test steps and expectations, as well as other aspects of testing. The test case specification can be used to generate standardized test case information that can be input to a test automation service to generate a test case outline or program code serving as a basis for execution of the test case.

As used herein, the term "test case" refers generally to the initial conditions, test steps, and expectations associated with verifying that a particular aspect of a software application or feature is working as intended. For example, a test case may include a series of steps, each including a number of API transactions. In some examples, a test suite or other suitable grouping may include one or more test cases.

The following non-limiting example is provided to introduce certain concepts. In an example method, a computing device receives, from a GUI, a test case specification in the form of a graph with a number of nodes, connected by edges, and one or more associated labels or tags. For instance, a test engineer may use the GUI to input the test case specification using GUI controls in accordance with the structure of a particular API or test plan. The graph-based test case specification can enable the test engineer to design the test case specification with a reduced error rate, reduced repetitive manual work, and in less time.

Certain nodes in the test case specification may be associated with a number of preconditions and step-expectation maps. For example, preconditions can be used to specify configurations or contexts that must be in place before test case execution. Step-expectation maps may relate to particular actions to perform and verifications to perform following those actions. The preconditions and step-expectation maps can be used to generate a test case outline, which can then be used to generate an executable test case. In some examples, the test case specification can be used to generate executable test program code.

Following receipt of the test case specification, the computing device generates standardized test case information that includes a representation of the test case specification, including the one or more preconditions, and the one or more step-expectation maps. The representation includes a structure portion and a style portion as well as an image of the test case specification. The image can be used to provide a visual representation of the test case specification to ease comprehension, provide documentation, record version histories, and so on. The representation, along with the image (or a reference thereto), are packaged into a data structure such as a JavaScript Object Notation (JSON) object. The data structure is based on a standard specified by a test automation service, such as the OpenAPI standard or a custom organizational standard. Finally, the computing device outputs the standardized test case information. For example, the standardized test case information can received and used by the test automation service to generate the test case outline or program code, among many other possible applications. The use of standardized test information can allow test engineers to share information in a standardized format regardless of the format in which the test case was originally specified.

The test case outline, upon population by a test engineer, or the generated program code can then be executed by the test automation service. For example, the generated test case outlines or program code can be integrated into a test suite which can then be periodically executed to test new application code, monitor for regressions, and so on. In some examples, the standardized test information can include specifications of how to incorporate the generated test cases into existing test suites, periodicities for execution, or actions to take upon test failures or successes, among other instructions to the test automation service.

The innovations of the present disclosure provide significant improvements in the technical field of automated software testing. Error rates and repetitive tasks can be reduced, thereby improving the time to develop tests as well as the accuracy or effectiveness of those tests. The lower error rates (e.g., fewer failed tests, fewer improperly tested APIs, fewer incorrectly applied organizational standards, etc.) may result in reduced storage space consumption or processing resource consumption. For example, every failed test is a test that must typically be run again until it passes. Therefore, failed tests that could have been prevented with better tooling can translate directly into greater consumption of testing processing resources. Likewise, failed tests may produce a "paper trail" of logs and other debugging information, again illustrating the extent to which fewer failed tests can result in lowered storage space consumption. Additionally, the innovations of the present disclosure may result in a stronger test suite with maximized code coverage or API coverage thereby causing reduced storage space consumption or processing resource consumption through more robust and better-designed production software. The use of standardized test information can likewise reduce error rates and improve computational efficiency through optimization and standardization of the resulting executable test code.

These illustrative examples are given to introduce the reader to the general subject matter discussed herein and the disclosure is not limited to these examples. The following sections describe various additional non-limiting example of techniques for generation of standardized test case information using graph-based methods.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
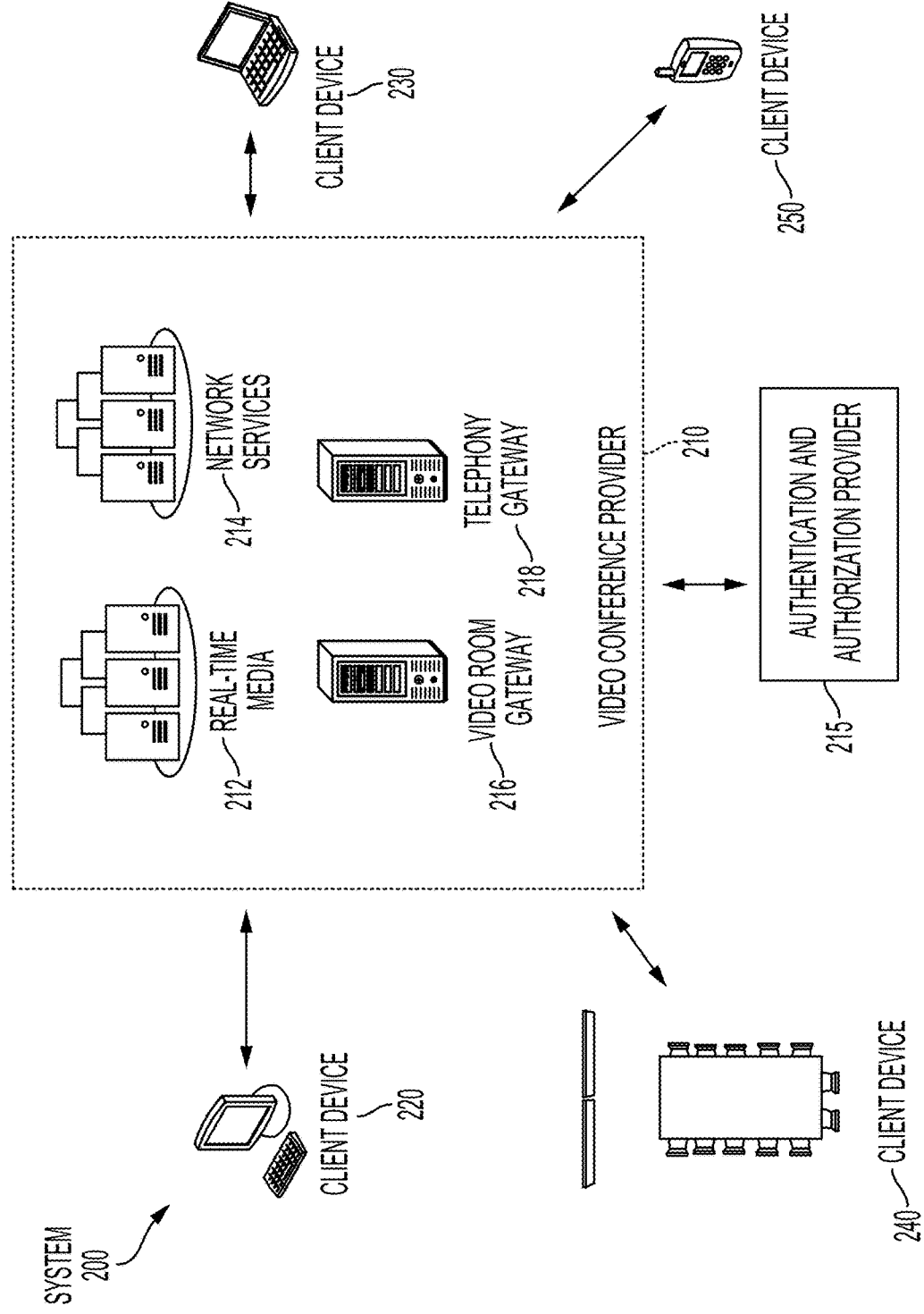
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request.

Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
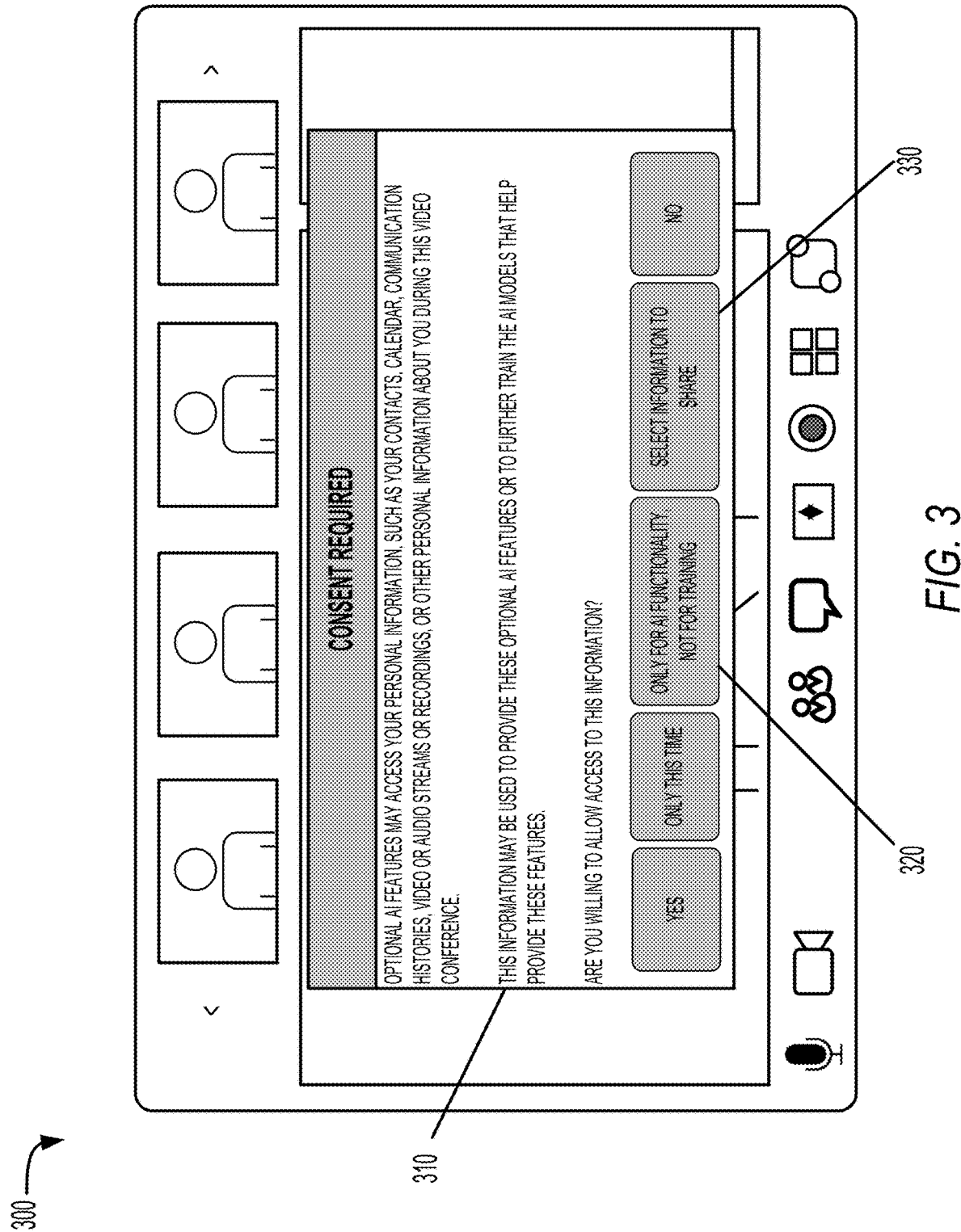
FIG. 3 shows an example user interface that may be used in some example systems configured for generation of standardized test case information using graph-based methods, according to some aspects of the present disclosure.

Turning next to FIG. 3, FIG. 3 shows an example user interface 300 that may be used in some example systems for generation of standardized test case information using graph-based methods. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
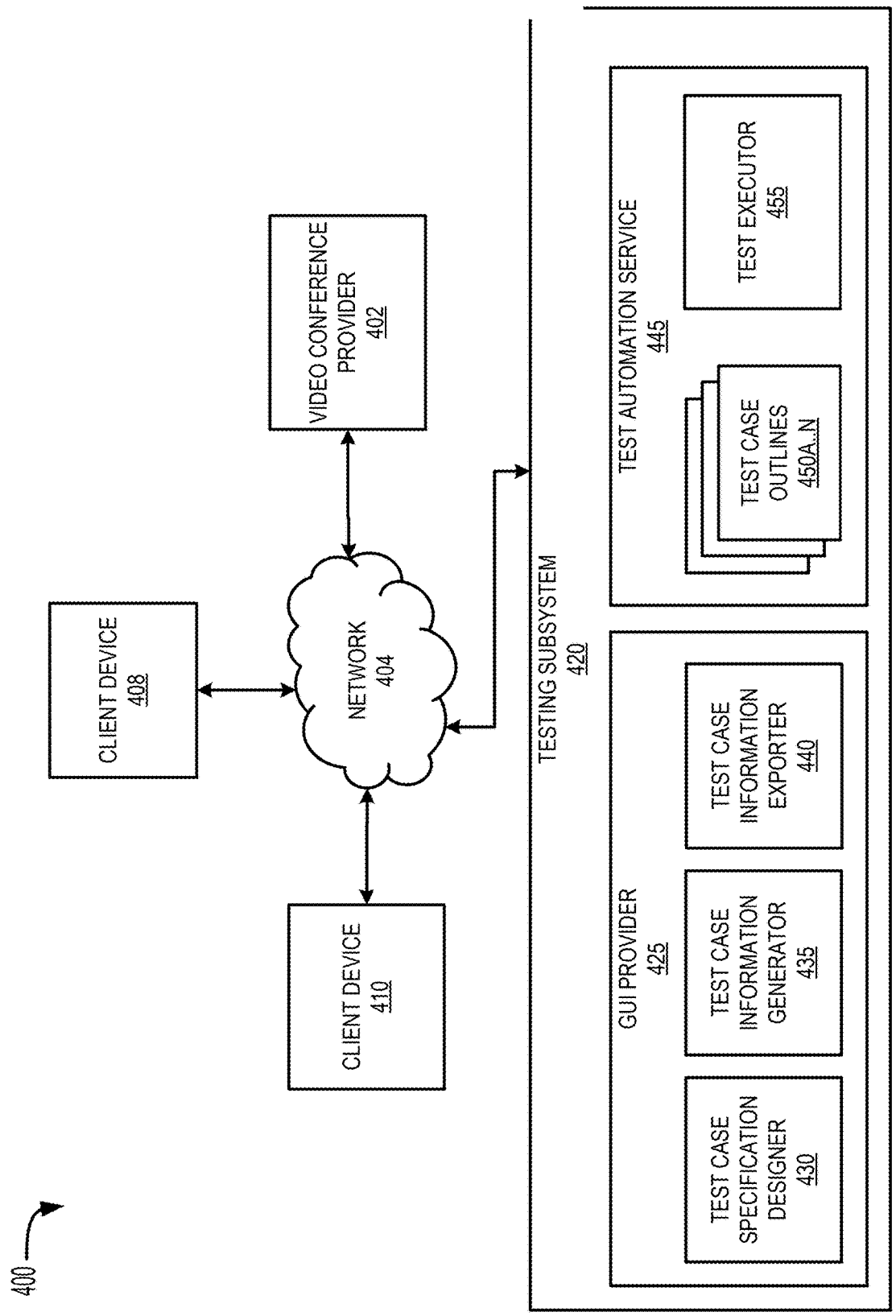
FIG. 4 shows an example of a system generating standardized test case information using graph-based methods, according to some aspects of the present disclosure.

Referring now to FIG. 4, FIG. 4 shows an example of a system 400 generating standardized test case information using graph-based methods. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the appropriate client software for generation of standardized test case information using graph-based methods. For example, the client devices 408, 410 may be laptops, desktops, smartphones, tablets, internet protocol (IP) phones, and so on. The client software for generation of graphs for test case generation may be executed on the client devices 408, 410 or may be provided by an external service, such as a web application provided by the video conference provider 402 or the testing subsystem 420, as described below.

The testing subsystem 420 includes components such as components for generating a graphical user interface (GUI) for graph generation and for test automation. The testing subsystem 420 can be, for example, a standalone server, an integrated component of another software system, a cloud-based service, a distributed module within a microservices architecture, or other configuration. The testing subsystem 420 is shown as a standalone subsystem in example system 400, but in some configurations may be a subsystem of, for example, the video conference provider 402.

The testing subsystem 420 includes a GUI provider 425. The GUI provider 425 includes components for generating a GUI that can receive a test case specification, generate standardized test case information, and outputting the standardized test case information, among other functions. In some examples, the GUI provider 425 provides a web application including a GUI for use on web browsers on client devices 408, 410. In another example, GUI provider 425 can provide a web-based application programming interface (API) for populating and operating GUI elements on an application executing on client devices 408, 410. Other configurations for GUI provider 425 are also possible. For instance, GUI provider 425 can be configured to interface with a desktop application, a mobile app for smartphones and tablets, a browser extension enhancing web functionalities, and so on.

The GUI provider 425 includes a test case specification designer 430. The test case specification designer 430 includes a GUI that enables a user such as a test engineer or quality assurance tester to design a representation of a test case specification such as a graph or other graphical representations of test case specifications like flowcharts, unified modeling language (UML) diagrams, sequence diagrams, state transition diagrams, swimlane diagrams, or other suitable representations.

For example, the test case specification designer 430 can be used to create, view, edit, or delete graph representations that include a graph with a number of nodes, in which at least one pair of nodes are connected by an edge. In this context, the term "graph" refers to visual representation of a data structure that can model relations between nodes, sometimes called vertices, and edges connecting the nodes to indicate the relationships. The graph encodes a hierarchical, tree-like structure including "branches" that each include a particular collection of nodes and their connecting edges.

A graph representation of a test case specification can be used to represent a number of individual test cases that are traversed through by, for example, the test automation service 445, in a hierarchical manner beginning with one or more nodes at the highest level of the hierarchy. The graph representation, as is described below, is converted into a standardized format that can be used to outline or generate program code that can be executed to perform the individual test cases.

The graph includes at least one node. For example, the test case specification designer 430 can be used to designate a node as a test case node. Each test case node, corresponding to an individual test case, can include one or more associated preconditions and one or more associated step-expectation maps. In this context, preconditions refer generally to configurations or contexts that must be implemented before test case execution. Likewise, step-expectation maps refer generally to test actions to perform and verifications to perform following those test actions. The mapping may be a one-to-one, one-to-many, many-to-one, or many-to-many mapping, according to the particular individual test case. Each test case node can be used to generate a test case outline by the test automation service 445, pseudocode, executable code, or other formats based on the standardized test information derived from the graph.

The graph representation can encode a particular ordering or manner of traversal. For example, the graph can be configured to be traversed using a depth-first search strategy, in which each test case of each branch of the graph is executed iteratively, until a last node is reached, before moving on to the next branch. Another example strategy for traversal is the breadth-first search strategy in which all test case nodes at a particular depth, or distance from the top-level of the hierarchy, are executed before moving on to the next depth. In addition to these examples, numerous additional traversal strategies are possible. The strategy for traversal can be included in the standardized test information as a string, a sequence of instructions, or other suitable format.

The simplest example of a graph includes only test cade nodes, but other nodes types may be used that introduce additional functionality and organizational capabilities. In some examples, the test case specification designer 430 can be used to design a graph that includes a top-level node with at least one section node. The top-level node can be itself a test case node or it can be a container for sections (described below) or one or more test case nodes. Some nodes are designated as section nodes. Section nodes can function similarly to the top-level node in that they can contain one or more test case nodes. In this example, section nodes can be used for organizational grouping, documentation, or other administrative purposes.

The graph hierarchy example including a top-level node, one or more section nodes, and each section node having one or more test cases nodes is only an example hierarchy, and any number of other possible hierarchies including test case nodes at all levels of the hierarchy as well as different node types, are possible. For example, one possible hierarchy could include inheritance properties, in which preconditions, steps, and expectations associated with nodes or sections apply to child nodes or sections. In another example, section nodes can specify certain properties that apply to each contained child section or node, such as preconditions, portions thereof, or templates for preconditions.

The preconditions can include a specification of the preconditions for executing a particular test case. Preconditions may include necessary conditions or states assumed or required prior to the execution of a test case. For example, the preconditions can ensure the operating system environment is correctly prepared for testing. Other examples of preconditions include specific software or hardware configurations, necessary data states, or required system settings.

A simple example may include a function that deletes a file using native functions provided by an operating system, such as Windows. A precondition for this test is that the operating system is Windows. The preconditions may be specified using text, pseudocode, or program code in a particular or several programming languages or scripting languages.

The preconditions are then associated with step-expectation maps. The steps can include one or more instructions or commands configured to cause particular action. The expectation then specifies how the executing program should react to the action. For instance, in the example relating to deleting a file, the step may be execution of a delete operation and the expectation may be a positive Boolean check that the file is deleted. This example illustrates a one-to-one mapping including a single step and single expectation.

Test cases can include a number of step-expectation mappings and a graph or other representation may include a combination of one-to-one, one-to-many, many-to-one, or many-to-many mappings. As with preconditions, step-expectation mappings may be specified using text, pseudocode, or program code in a particular or several programming languages or scripting languages.

Specification of preconditions and step-expectation mappings is only one example of the way that a test case can be specified. For example, the "Given/When/Then" approach structures tests by establishing an initial context, specifying a specific action, and defining the expected outcome. The "Given/When/Then" paradigm may involve a more stringent separation between the specific action and the expected outcome, effectively limiting the step-expectation mappings described above to one-to-one mappings. Other testing paradigms can be used, each of which may result in different data structures or types used in the test case nodes.

The test case specification designer 430 can be used to create and associate one or more labels or tags with nodes. Tags can include textual information that characterize the node. For example, tags may include contextual information such as test case priority, name, description, cross-references, test type, security information, and so on. In some examples, test case specification designer 430 may provide predefined tags that can be selected by the user using an appropriate GUI control. In some examples, custom tags may be entered using keyboard input and may contain arbitrary text, images, emojis, or other data.

Following creation or updating of a test case specification using the test case specification designer 430, the GUI provider 425 includes a test case information generator 435 for conversion of the test case specification to a standardized format. The test case information generator 435 generates standardized test case information based on the test case specification, such as the graph described above, designed using test case specification designer 430. The standardized test information may be generated in a structured data format such as JSON or XML. The standardized test information can be based on a test case specification standard of a test automation service such as test automation service 445. For example, the standard may require a JSON object or file using the OpenAPI format or other standard format used for importing of test case specifications by test automation systems such as test automation service 445.

Other standardized formats may be used such as objects defined using YAML Ain't Markup Language (YAML) or Tom's Obvious, Minimal Language (TOML). In addition, an application or associated organization may use custom formats for recorded HTTP data such as well-defined, custom JSON or XML formats. The use of the standardized test information allows test engineers or other users to generate test case specifications using a variety of tools that can then be imported into the test automation service 445 using a well-defined, standardized format.

The standardized test case information includes the one or more preconditions, and the associated step-expectation maps. Additionally, the standardized test case information can include information about the graphical representation, instructions relating to traversal or ordering for test execution, metadata about the graphical representation, and so on. The information associated with the test case specification is included in a data structure containing a representation of the test case specification, that has a structure portion and a style portion. For example, the data structure can include representations of the text, structure, or style of the graph designed using the test case specification designer 430 as well as other data of associated with the test specification. For instance, in some examples, the data structure can include an image of the graph designed using the test case specification designer 430.

In some examples, generation of the standardized test case information can be based on one or more tags. In this example, the tags may correspond to, for example, a constraint on the test case specification. For instance, one tag may identify the type of test specified by a test case specification (e.g., unit, functional, integration, etc.). Based on the test type specified, the format or structure of the output standardized test case information may vary. A unit test may include a simplified preconditions section, whereas an integration test may have a detailed preconditions template with subsections including authentication information and so on.

The GUI provider 425 includes a test case information exporter 440. The test case information exporter 440 can include components for transmitting the standardized test case information to the test automation service 445. For instance, the test case information exporter 440 can serialize and export the generated standardized test case information to a web-based API hosted by the test automation service 445. In some examples, the test automation service 445 may instead include a tool for importing the standardized test case information using a web-based API or GUI-based import tool.

The testing subsystem 420 includes a test automation service 445. The test automation service 445 includes components for receiving the standardized test case information generated by the GUI provided by the GUI provider 425, converting the standardized test case information into test case outlines, and for executing test cases, among other functions.

In some examples, the GUI-based import tool can include controls for specifying a top-level node. In that case, test case sections and nodes may be created in the top-level node section. The GUI-based import tool may import standardized test case information in various formats including the standardized test case information generated by the test case information generator 435 or as an Xmind file. An Xmind file is an open document file format associated with the XMind mind mapping and brainstorming software used for generating graphs such as the one described above with respect to the test case specification designer 430. An Xmind file may be a compressed ZIP archive containing XML files and other resources that represent the graph structure, content, and layout of a test case specification.

Upon receipt of the standardized test case information, the test automation service 445 may generate one or more test case outlines 450A . . . N based on the received standardized test case information. For example, the standardized test case information may include specification of several test cases, including preconditions and step-expectation mappings, and other components. The test automation service 445 can convert the test case information to test case outlines 450A . . . N that can be populated with program code for executing the test case using code from a suitable programming language or scripting language.

In some examples, the standardized test case information can be output to the test automation service 445 to cause generation of executable instructions corresponding to the preconditions associated with a test case node and the associated step-expectation maps associated with the test case node. For example, the test case specification designer 430 can be used to specify preconditions and associated step-expectation maps using pseudocode or plain language. A machine learning model such as a large language model can then be used by the test automation service 445 to generate program code in a suitable programming language to execute the test case. The large language model can be any suitable large language model for generation of program code from natural language such as the Generative Pre-trained Transformer (GPT) models.

The test automation service 445 depicted in example system 400 includes test executor 455. Test executor 455 can be used for execution of the test case outlines 450A . . . N following manual or automatic population with program code. For example, the test execution can access a particular test case outline 450A, establish the preconditions, and then execute the steps serially or in parallel, followed by verification of the expectations. The test executor 455 can output the result of the test execution(s) in a suitable format such a text listing, tabular format, graphical format, dashboard, and so on. In some examples, the test executor 455 can generate notifications when tests or a threshold number of tests succeed or fail according to a particular configuration.

Figure 5:
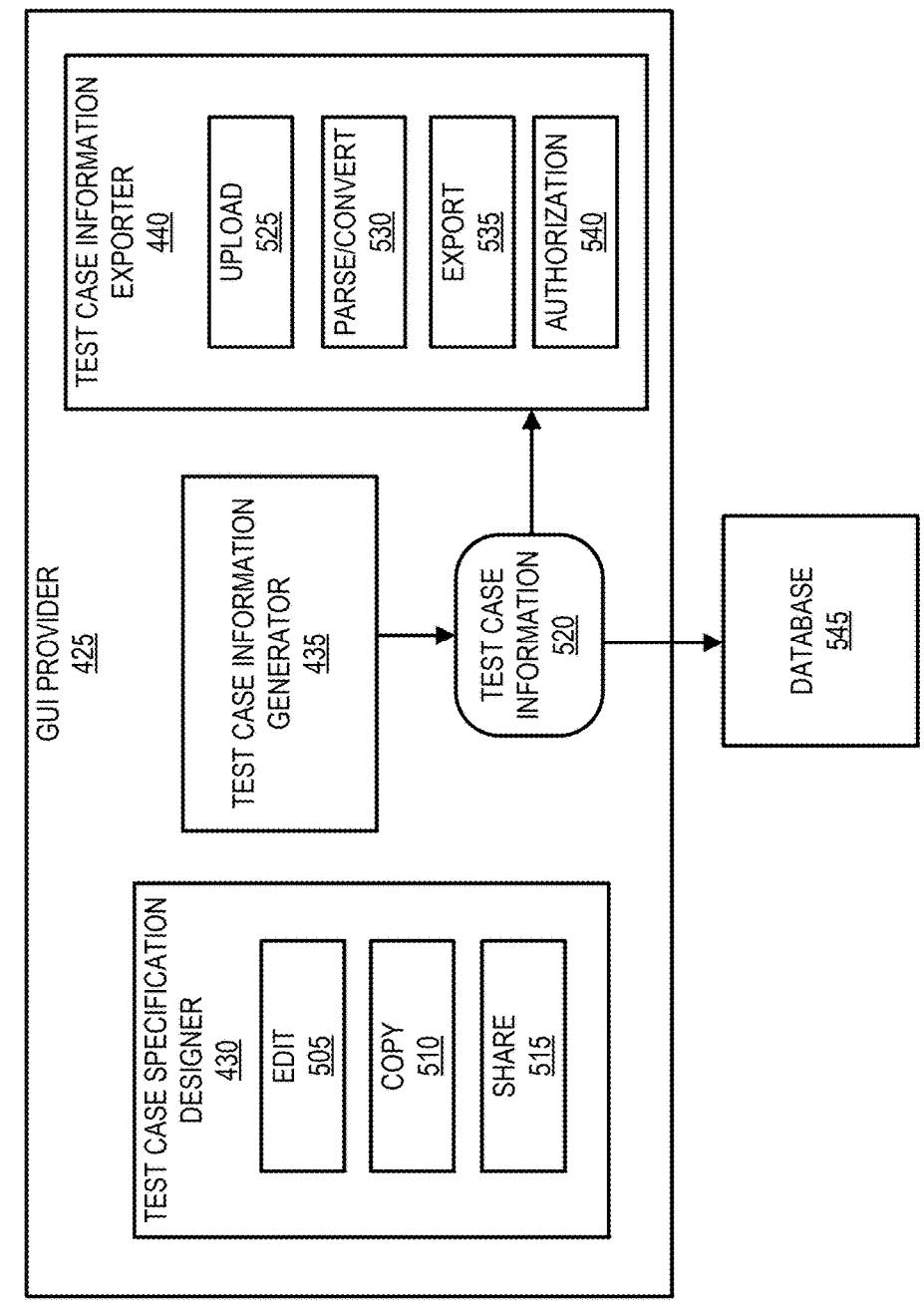
FIG. 5 shows a detailed view of a particular embodiment of a graphical user interface (GUI) provider, according to some aspects of the present disclosure.

Referring now to FIG. 5, FIG. 5 shows a detailed view of a particular embodiment 500 of the GUI provider 425, according to some examples. Embodiment 500 is depicted with particular implementations of certain components of GUI provider 425 to illustrate certain concepts, but other implementations are possible.

Figure 6:
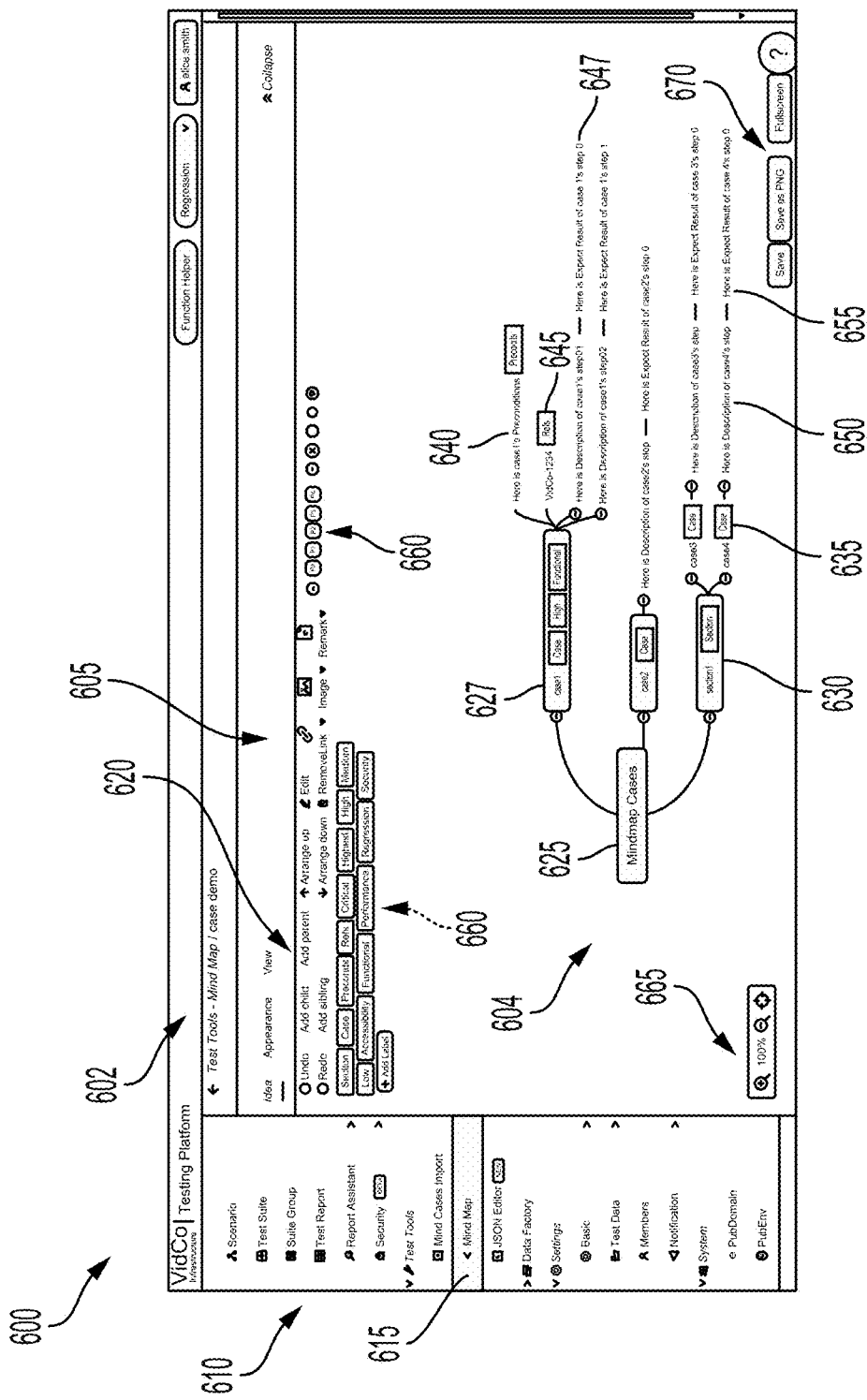
FIG. 6 shows an example GUI for generation of standardized test case information using graph-based methods, according to some aspects of the present disclosure.

Test case specification designer 430 includes an edit component 505. The edit component 505 can render a GUI for creation, design, editing, updating, and deleting graphs or other graphical representations of test case specifications. The GUI rendered by the edit component 505 may include controls and functionality for adding or removing nodes, adding or removing hierarchy (e.g., adding a parent node or removing a child node), moving or rearranging graphical representations of nodes, changing styles (e.g., colors, fonts, shapes, etc.), and so on. In some examples, the GUI functionality for edit component 505 may be incorporated from third-party open-source libraries such as the KityMinder Core open-source project or the AgileTC open-source project. In addition to graphs, the edit component 505 can be used to edit other graphical representations of test case specifications such as flowcharts, unified modeling language (UML) diagrams, sequence diagrams, state transition diagrams, swimlane diagrams, or other suitable representations. An example GUI that might be provided by the edit component 505 for graph creation and editing is depicted in FIG. 6.

Test case specification designer 430 includes a copy component 510. The copy component 510 can be used to copy or duplicate existing graphs. For example, one test suite may include several similar test case specifications with minor variations. The copy component 510 can be used to copy or duplicate a finalized graph or other representation, whose copies can then be edited using edit component 505 to include the minor variations.

Test case specification designer 430 includes a share component 515. The share component 515 can be used to share or notify users, such as test engineers, of created, in-progress, modified, or completed graphical representations. For example, the share component 515 may include functionality for emailing images of completed graphs to team members for review or approval. In another example, the share component 515 may include sharing functionality to share images or other representations on social media, such as an organization's internal wiki or news feed.

Following generation of a test case specification using test case specification designer 430, the test case information generator 435 generates standardized test case information 520 as described above with respect to FIG. 4. The standardized test case information 520 can be generated as a file and stored offline in, for example, a local filesystem, shared network drive, or other suitable filesystem. In some examples, the standardized test case information 520, once serialized and otherwise prepared for writing to disk, can be stored in a database 545. The database 545 can be a local, network, or cloud-based database. For example, in implementations using a cloud-based database 545, the standardized test case information 520 can be uploaded to a cloud-based database providing by a cloud hosting provider such as Amazon Web Services (AWS). In some examples, portions of the standardized test case information 520 (e.g., textual portions and binary portions) can be stored in separate databases 545. For instance, textual portions may be stored in a relational database such as MySQL (or the AWS Aurora implementation thereof) while binary portions may be stored in an object storage database such as AWS Simple Storage Service (S3). The standardized test case information 520 can also be kept online and exported directly to the test automation service 445 without intermediate storage.

The standardized test case information 520 is exported to the test automation service 445 by the test case information exporter 440 as described above with respect to FIG. 4. The test case information exporter 440 includes an upload component 525 for receiving the standardized test case information 520 in a form suitable for export. For example, the upload component 525 may provide a GUI or API for receiving the standardized test case information 520, allowing users of the test case specification designer 430 to configure implementations for manual or automatic export.

The test case information exporter 440 includes a parse and convert component 530. The parse and convert component 530 can receive the standardized test case information 520 as received by the upload component 525 and prepare it for export by an export component 535. For instance, the standardized test case information 520 may be serialized, compressed, encrypted, or otherwise transformed prior to export. The export component 535 can be configured to send or upload the standardized test case information 520 to a downstream consumer such as the test automation service 445. For example, the export component 535 can use an API provided by the test automation service 445.

The test case information exporter 440 includes an authorization component 540. The authorization component 540 can communicate with downstream export targets such as the test automation service 445 to manage authentication and authorization thereto. For example, the test automation service 445 may provide an API to which the standardized test case information 520 can be exported. The API may require an API key, secret, or other authentication credentials. Such credentials can be stored or managed by the authorization component 540.

Referring now to FIG. 6, FIG. 6 shows an example GUI 600 for generation of standardized test case information using graph-based methods, according to some examples. Example GUI 600 includes main editing frame 602 and navigation pane 610. Navigation pane 610 includes controls for accessing a variety of functions relating to test engineering, including generation of standardized test case information using graph-based methods as indicated by the tab 615 labeled "Mind Map." Selection of the tab 615 using a suitable input device such as a mouse can cause the GUI provider to draw the example graph 604 shown in main editing frame 602. Example graph 604 depicts a graph that represents a number of test cases. In GUI 600, graph 604 is, for example, being reviewed, is under development, or is being edited.

Graph 604 is shown in a particular example configuration for illustrative purposes. A variety of combinations of nodes, edges, labels, and so forth are possible according to certain examples, including differing hierarchies and testing paradigms. Example graph 604 includes a top-level node 625. Top-level node 625 includes 3 sub-nodes, including a test case node 627 and a section node 630. The section node 630 itself contains 2 more test case nodes, including test case node 635. Test case node 627 includes precondition 640 and reference 645, in addition to step-expectation mappings 647. Test case node 635 includes only one step 650 and expectation 655 pair.

The step 650 and expectation 655 pair illustrate a step description and mapped expectation description. In some examples, each expectation description is mapped to at least one step description. Likewise, the precondition 640 includes a precondition description. The example descriptions shown are plain language descriptions. However, precondition 640, step 650, or expectation 655 can be specified using plain language, pseudocode, program code, or any other suitable means for communication of the test case specification.

The reference 645 is shown as a link to reference documentation, such as an issue ticket or bug tracker. However, the reference 645 can be any kind of external reference used to add additional context to the particular test case 627. For example, the reference 645 can be a link to a website or other network location (e.g., a uniform resource locator (URL)), an attached document, a related test case specification, and so on. In some examples, reference 645 includes a reference descriptor that includes information about accessing the reference 645 such as a hyperlink or link to a shared network location.

The main editing frame 602 includes zoom controls 665 for changing zoom level of the displayed graph 604 as may be useful or required during design or editing. Following completion or design or editing of the test case specification represented by graph 604, save controls 670 can be used to persist the modified graph 604. In some examples, the save controls 670 can be used to persist the graph 604 structure, data, and style to a database. In other examples, the persisted graph 604 can be saved to a file and stored on a local filesystem or in another memory device. Save controls 670 are additionally depicted with a control for capturing an image of the graph 604 in the portable network graphic (PNG) format, but other image formats can be similarly used. The image can be included in the standardized test case information generated by the test case information generator 435. The image can be used to provide a visual representation of the test case specification to facilitate comprehension by test engineers executing the test cases, to provide documentation, to provide a means to record revision history, and so on.

The GUI 600 provides facilities for designing, editing, and reviewing the test case specification represented by graph 604, as described above. In some examples, certain open-source frameworks can be used for providing the GUI 600 and associated functionality for generation of standardized test case information using graph-based methods. For example, certain embodiments may use some elements of the KityMinder Core open-source project for providing GUI 600. Likewise, certain embodiments may use some elements of the AgileTC open source project for providing GUI 600.

Figure 7:
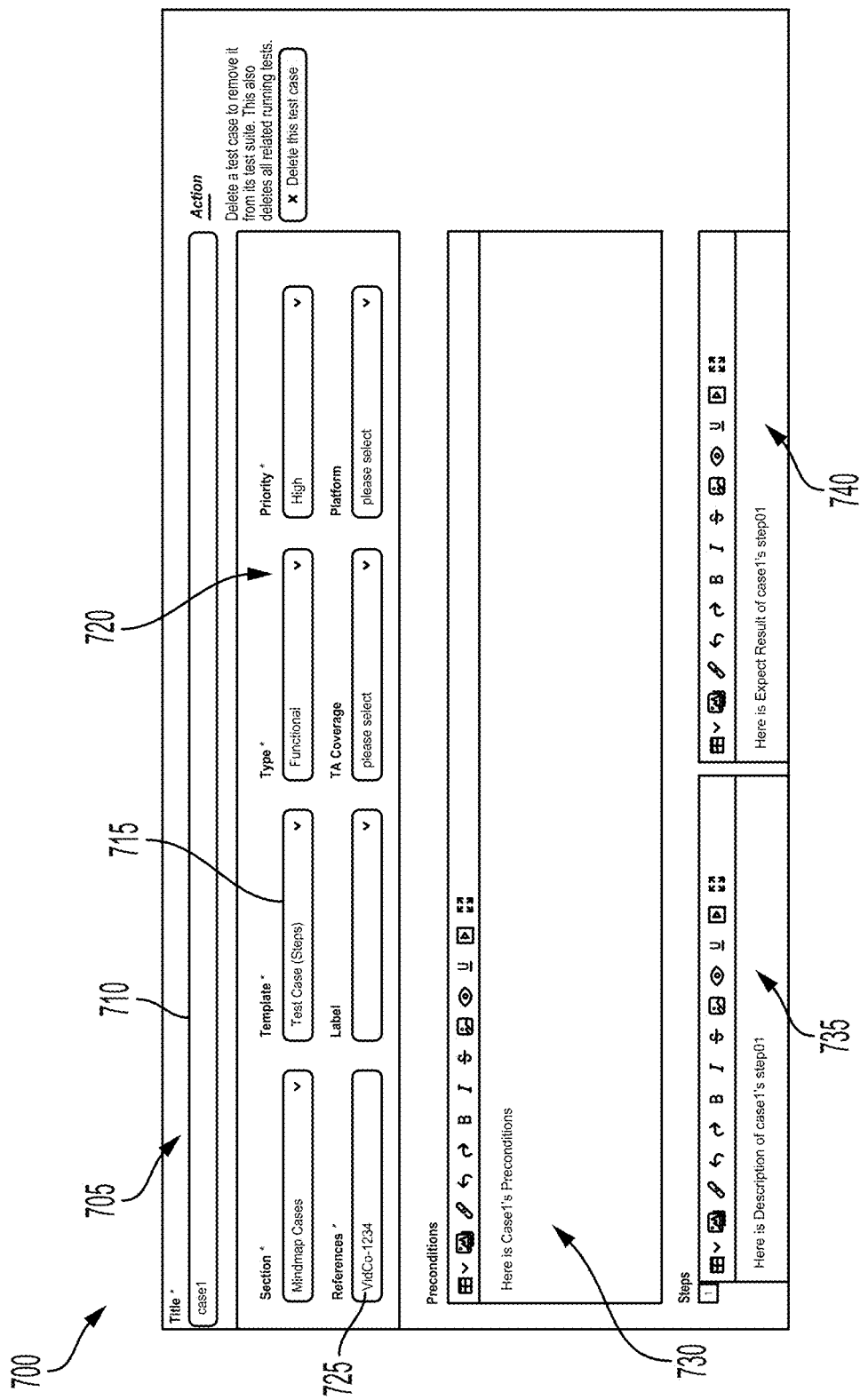
FIG. 7 shows an example GUI for test case editing following generation of standardized test case information using graph-based methods, according to some aspects of the present disclosure.

Referring now to FIG. 7, FIG. 7 shows an example GUI 700 for test case editing following generation of standardized test case information using graph-based methods, according to some examples. For instance, the GUI 700 can be used to edit the preconditions and step-expectation mappings of a particular test case node. In this example, the GUI 700 is depicted as editing the preconditions 640, reference 645, and step-expectation mappings 647 of test case node 627 shown above in FIG. 6. However, in some examples, the preconditions and step-expectation mappings of the particular test case node can be edited directly on interface included in the main editing frame 602 described above.

Within the main editing window 705 of GUI 700, a test case node name input box 710 can be used for editing the name of test case node 627. The main editing window 705 may include a template selection control 715. The template selection control 715 can be used to select from among a number of prepared templates to reduce repetitive or duplicitous creation of similar test cases. Templates may also include different facets of tests cases such as inputs for testing paradigms other than step-expectation mapping. Some implementations may include an editor for generating and editing the templates (not shown).

Also within the main editing window 705 are tag selector controls 720. The tag selector controls 720 can be used for selection of predefined tags such as organizationally-defined priority values and test types. Main editing window 705 includes a reference input control 725 that can be used for identification of reference links or documents. In some examples, the reference input control 725 can identify certain categories of reference and augment the input value with rich controls such as hyperlinks. For instance, if the input reference value corresponds to an issue ticket (e.g., "ZOOM-1234") the reference input control 725 can identify the input as corresponding to a valid issue ticket using a suitable API and add a hyperlink.

The main editing window 705 includes a text input for preconditions 730, a text input for steps 735, and a text input for the associated expectations 740. The text inputs 730, 735, and 740 may include various standard text editing and word processing features such as styling, inline objects, formatting, and so on. As discussed above with respect to FIG. 4, the preconditions, steps, and expectations may be input as plain text, pseudocode, program code, or any other suitable form in accordance with the configuration of the downstream consumer such as the test automation service 445.

Figure 8:
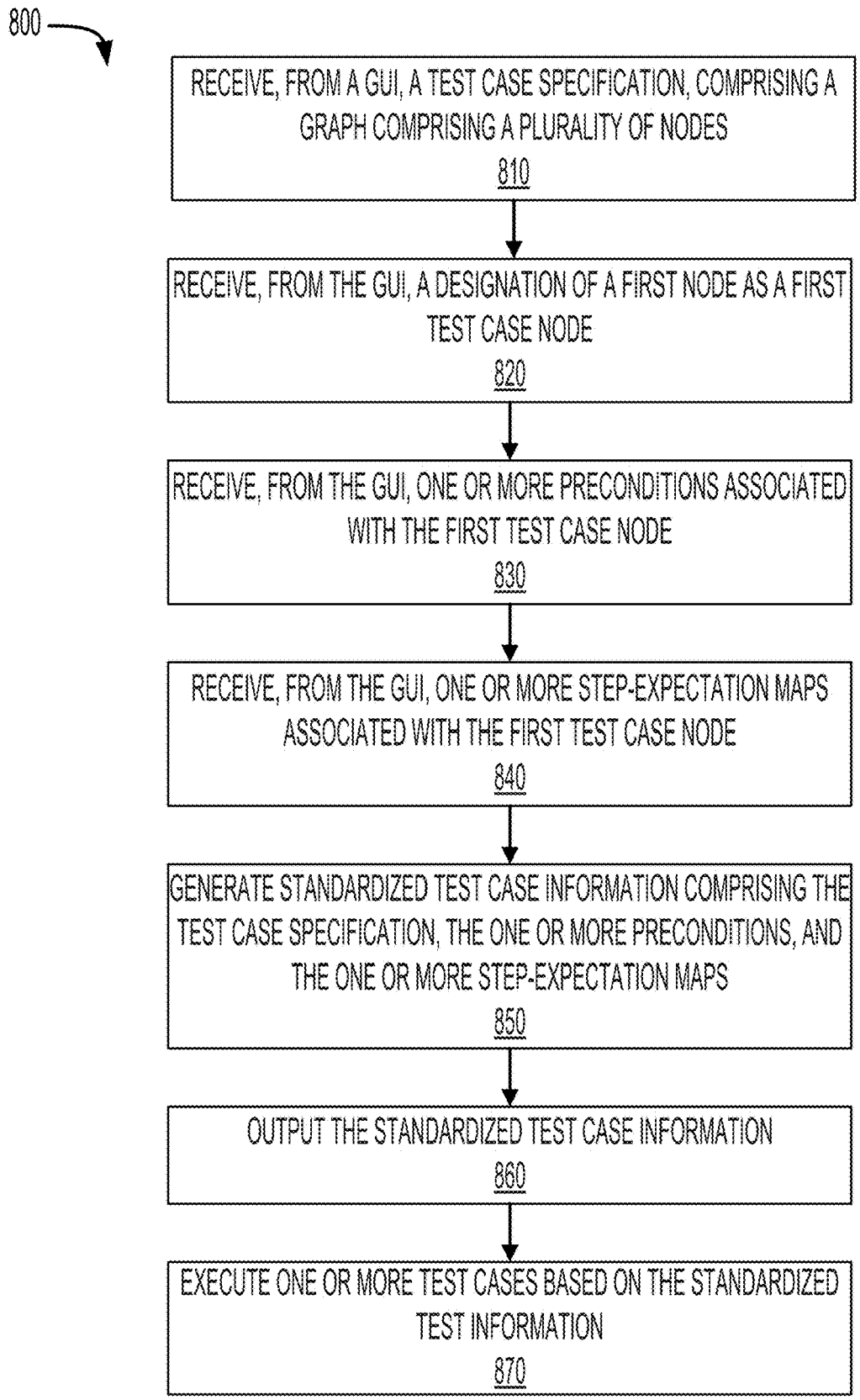
FIG. 8 shows a flowchart of an example method for generation of standardized test case information using graph-based methods, according to some aspects of the present disclosure.

Referring now to FIG. 8, FIG. 8 shows a flowchart of an example method 800 for generation of standardized test case information using graph-based methods. The description of the method 800 in FIG. 8 will be made with reference to FIGS. 4-7, however any suitable system according to this disclosure may be used, such as the example systems 100 and 200, shown in FIGS. 1 and 2. It should be appreciated that method 800 provides a particular method for providing name pronunciation for video conferences. Other sequences of operations may also be performed according to alternative examples. For example, alternative examples of the present disclosure may perform the steps outlined above in a different order. Moreover, the individual operations illustrated by method 800 may include multiple sub-operations that may be performed in various sequences as appropriate to the individual operation. Furthermore, additional operations may be added or removed depending on the particular applications. Further, the operations described in method 800 may be performed by different devices. For example, the description is given from the perspective of the testing subsystem 420 but other configurations are possible. One of ordinary skill in the art would recognize many variations, modifications, and alternatives.

The method 800 may include block 810. At block 810, the testing subsystem 420 receives, from a graphical user interface (GUI) provided by the GUI provider 425 of FIG. 4, a test case specification, including a graph made up of a plurality of nodes, in which at least one pair of nodes are connected by an edge. For example, an edit component 505 of the test case specification designer 430 of GUI provider 425 can render a GUI that can be used to draw a graph representing a test case or suite of test cases. The test cases can be arranged according to a logical grouping for which a visual representation of the collection of test cases is useful.

For instance, a collection or suite of test cases may be used to test a variety of scenarios relating to a particular API endpoint. The graph encodes a tree-like hierarchy that represents a number of test cases to be executed in a particular order, as described in detail with respect to FIG. 4. The simplest example of a graph includes only one or more connected test case nodes along with information indicating a strategy for traversal, but other node types and hierarchies are possible.

For example, the graph may have a top-level node corresponding to the endpoint. The top-level node may have a number of sections, each section corresponding to an HTTP verb that can be used to access the API endpoint. Each section in turn can include a variety of test cases specifying different parameters, options, authentication details, etc. used to access the API endpoint using the HTTP verb in the corresponding section. This is just one possible illustrative logical grouping of test cases for an example testing scenario and many others are possible. For instance, the top-level node may have only test case nodes as child nodes.

At block 820, the testing subsystem 420 receives, from the GUI, a designation of a first node as a first test case node. For example, GUIs such as the GUI 600 and GUI 700 of FIGS. 6 and 7, respectively, can be used to select and name a particular test case node. Selection or designation of a test case node may correspond to clicking it with an input device such as a mouse or otherwise providing an indication of selection. Test cases can be edited individually or collectively. For example, some embodiments may include functionality for selecting multiple test case nodes and applying changes to them as a group.

At block 830, the testing subsystem 420 receives, from the GUI, one or more preconditions associated with the first test case node. For example, the text input for preconditions 730 of FIG. 7 can be used to edit the preconditions for the first test case node. The preconditions may be input as plain text, pseudocode, program code, or any other suitable form in accordance with the configuration of the downstream consumer such as the test automation service 445.

For example, in a simple example involving multiplying two numbers, the preconditions may be stated in natural language as "start by assigning two numbers to variables." The same preconditions may be specified in pseudocode as:
// Setup: Define the inputs
a=4
b=5

The same preconditions may be specified in program code (e.g., Java code) as:
. . . public class TestCaseClass {
  @Test
  public void testMultiply( ) {
    // Setup: Define the inputs
    int a=4;
    int b=5; . . .

These examples are provided to illustrate that the testing subsystem 420 can receive the test case specification in a number of formats or a combination thereof. The content of the test case nodes may be used as a starting point for the authoring of test cases, a seed for the automatic generation of program code for testing, or they may contain test program code, ready for execution. Note that in the Java example previously given, some elements, such as import statements, are omitted here for clarity, but would be present in a functioning implementation.

At block 840, the testing subsystem 420 receives, from the GUI, one or more step-expectation maps associated with the first test case node. For example, the text input for steps 735 and the text input for the associated expectations 740 can be used to edit the step-expectation mappings for the first test case node. The steps and expectations may be input as plain text, pseudocode, program code, or any other suitable form in accordance with the configuration of the downstream consumer such as the test automation service 445.

Continuing with the examples above, in natural language an example step may be: "use the multiplication function to multiply the two variables." The corresponding expectation, again in natural language, is "the result of multiplying the two variables should be the first variable times the second variable." In pseudocode, this may be written as:
expected result=20
// step
result=multiply(a, b)
// expectation
If result==expected result Then
  Return true
Else
  Return false
End If
In Java, this may be written as (continuing the class definition above):
. . . // step
int result=multiply(a, b);
// expectation
int expected=20;
assertEquals(expected, result);
  }
}

In examples involving natural language or pseudocode, the standardized test case information can be output to the test automation service 445 to further cause generation of executable instructions corresponding to the preconditions and step-expectation maps. For example, a machine learning model such as a large language model can then be used by the test automation service 445 to generate program code in a suitable programming language to execute the test case. The large language model can be any suitable large language model for generation of program code from natural language such as the Generative Pre-trained Transformer (GPT) models (e.g., 3, 3.5, 4, etc.), PaLM 2, LlaMA 2, Claude 2, and so on. The test automation service 445 can use a suitable API provided by the large language model provider to convert natural language or pseudocode test specification into executable program code. The large language model can likewise be used to convert program code from one programming language to another. Other functions can be provided by the large language model, such as correcting or updating program code according to certain specifications. For instance, authentication information or program code can be added to modify test code to run under varying conditions or environments.

At block 850, the testing subsystem 420 generates standardized test case information including the test case specification, the one or more preconditions, and the one or more step-expectation maps. For example, a test case information generator 435 can be used to generate standardized test case information based on the test case specification designed using test case specification designer 430. The standardized test information may be in a structured data format such as JSON or XML. The standardized test information can be based on a test case specification standard of a test automation service such as test automation service 445. The use of standardized test case information can allow test engineers to share information in a standardized format regardless of the format in which the information was input by the user.

At block 860, the testing subsystem 420 outputs the standardized test case information. For example, as described above with respect to the test case information exporter 440 in FIG. 4, the testing subsystem 420 may output the standardized test case information by preparing it for transmission and then sending to a downstream consumer such as a test automation service 445. However, the test case information exporter 440 can also export the standardized test case information as a file, save it to a local or remote filesystem, database, and so on.

At block 870, the testing subsystem 420 executes one or more test cases based on the standardized test information. For example, the testing subsystem 420 may include a test automation service 445 as shown in FIG. 4. Test automation service 445 can generate test case outlines 450A . . . N based on the standardized test information. The test case outlines 450A . . . N can be populated with program code by a test engineer. In some examples, the test automation service 445 can generate test program code based on the standardized test information. The generated test case outlines or program code can then be executed by the test automation service 445.

For example, the generated test case outlines or program code can be integrated into a test suite which can then be periodically executed to test new application code, monitor for regressions, and so on. In some examples, the standardized test information can include specifications of how to incorporate the generated test cases into existing test suites, periodicities for execution, or actions to take upon test failures or successes, among other instructions to the test automation service.

Figure 9:
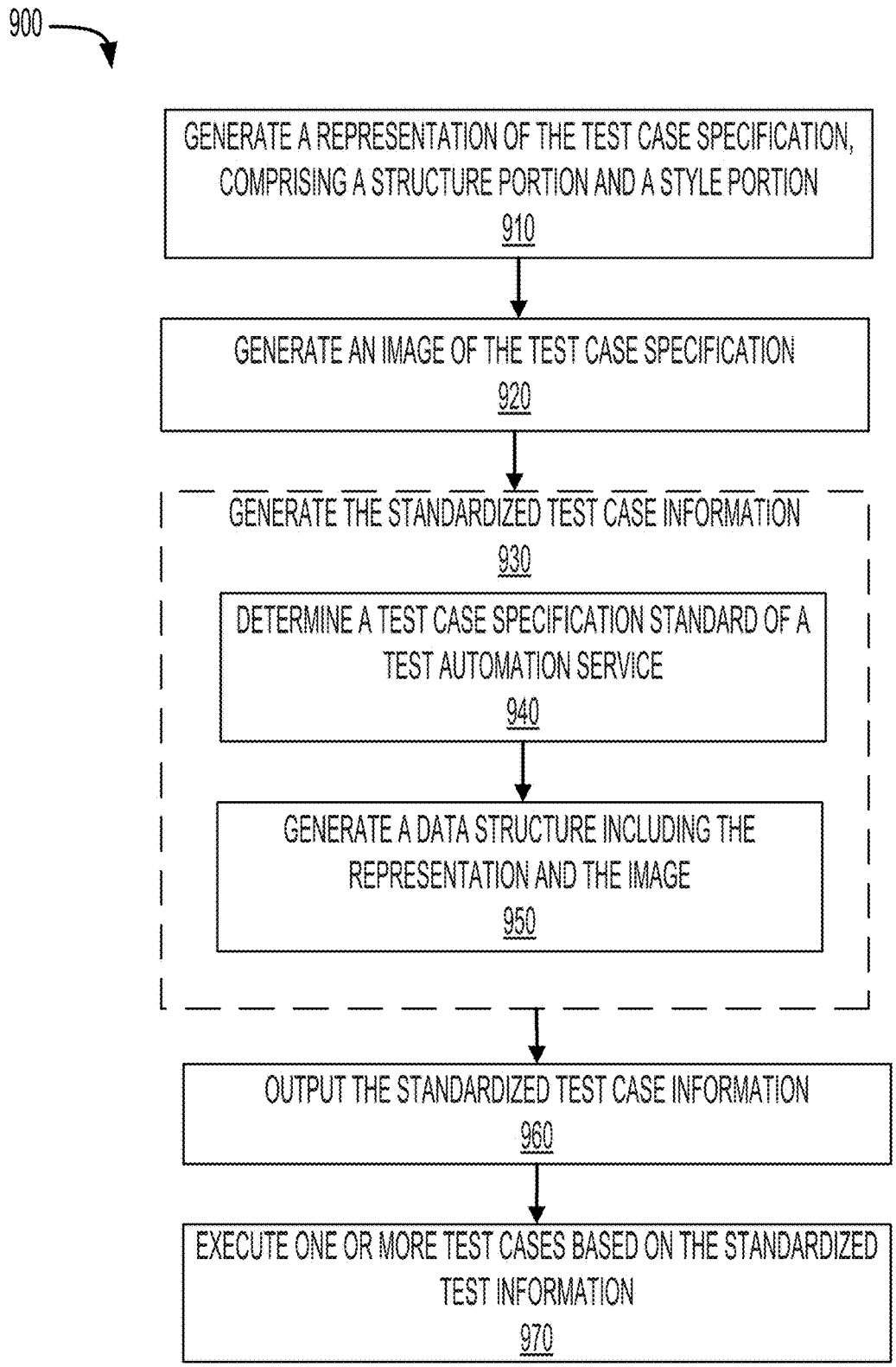
FIG. 9 shows a flowchart of an example method for generating standardized test case information for generation of standardized test case information using graph-based methods, according to some aspects of the present disclosure.

Referring now to FIG. 9, FIG. 9 shows a flowchart of an example method 900 for generating standardized test case information for generation of standardized test case information using graph-based methods. The description of the method 900 in FIG. 9 will be made with reference to FIGS. 4-7, however any suitable system according to this disclosure may be used, such as the example systems 100 and 200, shown in FIGS. 1 and 2. It should be appreciated that method 900 provides a particular method for providing name pronunciation for video conferences. Other sequences of operations may also be performed according to alternative examples. For example, alternative examples of the present disclosure may perform the steps outlined above in a different order. Moreover, the individual operations illustrated by method 900 may include multiple sub-operations that may be performed in various sequences as appropriate to the individual operation. Furthermore, additional operations may be added or removed depending on the particular applications. Further, the operations described in method 900 may be performed by different devices. For example, the description is given from the perspective of the testing subsystem 420 but other configurations are possible. One of ordinary skill in the art would recognize many variations, modifications, and alternatives.

The method 900 may include block 910. At block 910, the testing subsystem 420 generates a representation of the test case specification, including a structure portion and a style portion. For example, the test case information generator 435 may create a serializable object or class, that can include both textual information and binary information. Some aspects of the graphical representation of the test case specification may relate to structure, such as the hierarchy of nodes, edge relationships, labels, tags, associated text (e.g., preconditions, steps, and expectations). Other aspects may relate to style, such as font, colors, shapes, and so on. The structure and style of the underlying graphical representation may be encoded using textual or binary data according to the details of particular implementations.

At block 920, the testing subsystem 420 generates an image of the test case specification. For example, the save controls 670 of FIG. 6 can be used to capture an image of the in-progress or completed graphical representation of the test case specification. In some examples, the image may be captured automatically when the test case specification is sent to the test case information generator 435 for conversion to the standardized test information.

At block 930, the testing subsystem 420 generates the standardized test case information. The data structure, including both structural and style information about the test case specification, as well as the image, are then converted to the standardized test case information. As part of generating the standardized test case information at block 930, at block 940, the testing subsystem 420 determines a test case specification standard of a test automation service. For example, a JSON object or file using the OpenAPI format or other standard format used for importing of test case specifications by test automation systems such as test automation service 445. Other examples of standards that may be used for the generation of standardized test information include the GraphQL specification, Web Services Description Language (WSDL), RESTful API Modeling Language (RAML), Web Application Description Language (WADL), the Test Anything Protocol, the xUnit framework, Gherkin, Cucumber, the JUnit framework, and others.

As another part of generating the standardized test case information at block 930, at block 950, the testing subsystem 420 generates a data structure including the representation and the image. The data structure may be generated, for example, by serializing the class or object instantiated in block 910 to contain the structure and style portions of the graphical representation of the test case specification. In some examples, the serialized object may need to be manipulated, converted, or rearranged further to correspond to the test case specification standard determined in block 940.

At block 960, the testing subsystem 420 outputs the standardized test case information. For example, as described above with respect to the test case information exporter 440 in FIG. 4, the testing subsystem 420 may output the standardized test case information by preparing it for transmission and then sending to a downstream consumer such as a test automation service 445. For example, the testing subsystem 420 can send the standardized test information to the test automation service 445 using a web-based API. The test case information exporter 440 can also export the standardized test case information as a file, save it to a local or remote filesystem, database, and so on.

At block 970, the testing subsystem 420 executes one or more test cases based on the standardized test information. For example, the testing subsystem 420 may include a test automation service 445 as shown in FIG. 4. Test automation service 445 can generate test case outlines 450A . . . N based on the standardized test information. The test case outlines 450A . . . N may be a representation of the test case specification based on the information in the graph created using the test case specification designer 430. Foe example, the test case outlines 450A . . . N may be represented by a form including a number of pre-populated fields based on the preconditions and the step-expectation mappings. The fields can be populated with program code by a test engineer. In some examples, the form may include controls for automatically generating test program code based on pre-populated content of the fields using, for example, a large language model.

The generated test case outlines test case outlines 450A . . . N or program code can be integrated into a test suite which can then be periodically executed to test new application code, monitor for regressions, and so on. In some examples, the standardized test information can include specifications of how to incorporate the generated test cases into existing test suites, periodicities for execution, or actions to take upon test failures or successes, among other instructions to the test automation service. The test automation service 445 may be configured to execute commands upon completion or partial completion of the test suite based on the outcome of certain tests. For example, upon failure of security-critical tests, a notification can be sent to security engineers to cause corrective action to be taken.

Figure 10:
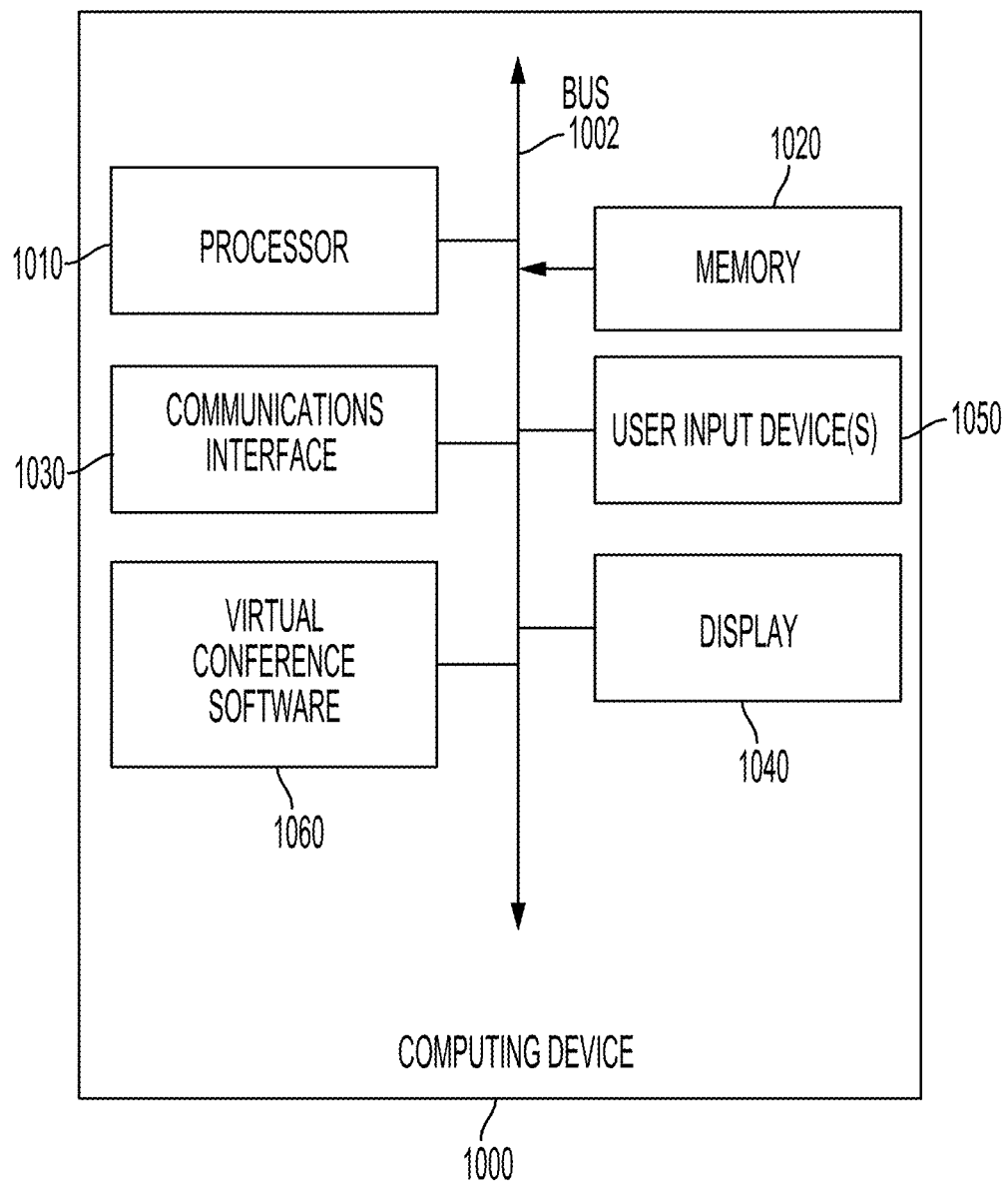
FIG. 10 shows an example computing device suitable for use in example systems or methods for providing techniques for generation of standardized test case information using graph-based methods, according to some aspects of the present disclosure.

Referring now to FIG. 10, FIG. 10 shows an example computing device 1000 suitable for use in example systems or methods for providing generation of standardized test case information using graph-based methods according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for generation of standardized test case information using graph-based methods according to different examples, such as part or all of the example methods 800 and 900 described above with respect to FIGS. 8 and 9. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes virtual conferencing software 1060 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving, from a graphical user interface (GUI), a test case specification, comprising a graph comprising a plurality of nodes, wherein at least one pair of nodes are connected by an edge; receiving, from the GUI, a designation of a first node as a first test case node; receiving, from the GUI, one or more preconditions associated with the first test case node; receiving, from the GUI, one or more step-expectation maps associated with the first test case node; generating standardized test case information comprising the test case specification, the one or more preconditions, and the one or more step-expectation maps, comprising: generating a representation of the test case specification, comprising a structure portion and a style portion; generating an image of the test case specification; and generating the standardized test case information, wherein: the generated standardized test case information includes a data structure including the representation and the image; and generating the standardized test case information is based on a test case specification standard of a test automation service; and outputting the standardized test case information.

Example 2 is the method of example(s) 1, wherein the plurality of nodes comprises at least one top-level node, comprising at least one section node, comprising at least one test case node, each test case node comprising one or more associated preconditions and one or more associated step-expectation maps.

Example 3 is the method of example(s) 1, wherein: each step-expectation map comprises: at least one step description; and at least one expectation description, each expectation description mapped to at least one step description; and each precondition comprises at least one precondition description.

Example 4 is the method of example(s) 1, wherein the first test case node further comprises an associated reference descriptor.

Example 5 is the method of example(s) 1, wherein the standardized test case information is output to the test automation service to cause generation of a test case outline, wherein the test case outline is characterized by at least the one or more preconditions associated with the first test case node and the one or more step-expectation maps associated with the first test case node.

Example 6 is the method of example(s) 5, wherein the standardized test case information is output to the test automation service to further cause generation of executable instructions corresponding to the one or more preconditions associated with the first test case node and the one or more step-expectation maps associated with the first test case node, wherein the test case outline comprises the executable instructions.

Example 7 is the method of example(s) 1, wherein at least one node of the plurality of nodes comprises a tag, wherein the tag comprises textual information.

Example 8 is the method of example(s) 7, wherein generating the standardized test case information is based on the tag, the tag corresponding to a constraint on the test case specification.

Example 9 is the method of example(s) 7, wherein the tag is selected from a plurality of predefined tags.

Example 10 is the method of example(s) 7, further comprising receiving, from the GUI, an indication of a custom tag textual information, wherein the tag is based on the custom tag textual information.

Example 11 is the method of example(s) 1, wherein the data structure is based on JavaScript Object Notation (JSON).

Example 12 is the method of example(s) 1, wherein the graphical user interface (GUI) is based on the KityMinder Core open source project.

Example 13 is the method of example(s) 1, wherein the graphical user interface (GUI) is based on the AgileTC open source project.

Example 14 is the method of example(s) 1, wherein the standardized test case information is based on the OpenAPI specification.

Example 15 is a non-transitory computer-readable medium storing instructions that, when executed by one or more processors, cause the one or more processors to perform operations including: receiving, from a graphical user interface (GUI), a test case specification, comprising a graph comprising a plurality of nodes, wherein at least one pair of nodes are connected by an edge; receiving, from the GUI, a designation of a first node as a first test case node; receiving, from the GUI, one or more preconditions associated with the first test case node; receiving, from the GUI, one or more step-expectation maps associated with the first test case node; generating standardized test case information comprising the test case specification, the one or more preconditions, and the one or more step-expectation maps, comprising: generating a representation of the test case specification, comprising a structure portion and a style portion; generating an image of the test case specification; and generating the standardized test case information, wherein: the generated standardized test case information includes a data structure including the representation and the image; and generating the standardized test case information is based on a test case specification standard of a test automation service; and outputting the standardized test case information.

Example 16 is the non-transitory computer-readable medium of example(s) 15, wherein the plurality of nodes comprises at least one top-level node, comprising: at least one section node, comprising one or more test case nodes; and at least one test case node, wherein each test case node comprises one or more associated preconditions and one or more associated step-expectation maps.

Example 17 is the non-transitory computer-readable medium of example(s) 15, wherein at least one node of the plurality of nodes comprises a tag, wherein the tag is a label that characterizes the node.

Example 18 is a system comprising: one or more processors; and one or more computer-readable storage media storing instructions which, when executed by the one or more processors, cause the one or more processors to perform operations including: receiving, from a graphical user interface (GUI), a test case specification, comprising a graph comprising a plurality of nodes, wherein at least one pair of nodes are connected by an edge; receiving, from the GUI, a designation of a first node as a first test case node; receiving, from the GUI, one or more preconditions associated with the first test case node; receiving, from the GUI, one or more step-expectation maps associated with the first test case node; generating standardized test case information comprising the test case specification, the one or more preconditions, and the one or more step-expectation maps, comprising: generating a representation of the test case specification, comprising a structure portion and a style portion; generating an image of the test case specification; and generating the standardized test case information, wherein: the generated standardized test case information includes a data structure including the representation and the image; and generating the standardized test case information is based on a test case specification standard of a test automation service; and outputting the standardized test case information.

Example 19 is the system of example(s) 18, wherein the plurality of nodes comprises at least one top-level node, comprising at least one section node, comprising at least one test case node, each test case node comprising: one or more tags; one or more associated preconditions; and one or more associated step-expectation maps, wherein: each step-expectation map comprises: at least one step description; and at least one expectation description, each expectation description mapped to at least one step description; and each precondition comprises at least one precondition description.

Example 20 is the system of example(s) 19, wherein: each tag is a label that characterizes the test case node; and the one or more tags include a case type tag or a case priority tag.

The invention claimed is:

1. A method, comprising:
receiving, from a graphical user interface (GUI), a test case specification, comprising a graph comprising a plurality of nodes, wherein at least one pair of nodes are connected by an edge;
receiving, from the GUI, a designation of a first node as a first test case node;
receiving, from the GUI, one or more preconditions associated with the first test case node;
receiving, from the GUI, one or more step-expectation maps associated with the first test case node;
generating standardized test case information comprising the test case specification, the one or more preconditions, and the one or more step-expectation maps, comprising:
generating a representation of the test case specification, comprising a structure portion and a style portion; generating an image of the test case specification; and
generating the standardized test case information, wherein:
the generated standardized test case information includes a data structure including the representation and the image; and
generating the standardized test case information based on a test case specification standard of a test automation service; and
outputting the standardized test case information.

2. The method of claim 1, wherein the plurality of nodes comprises
at least one top-level node, comprising
at least one section node, comprising
at least one test case node, each test case node comprising one or more associated preconditions and one or more associated step-expectation maps.

3. The method of claim 1, wherein:
each step-expectation map comprises:
at least one step description; and
at least one expectation description, each expectation description mapped to at least one step description; and
each precondition comprises at least one precondition description.

4. The method of claim 1, wherein the first test case node further comprises an associated reference descriptor.

5. The method of claim 1, wherein the standardized test case information is output to the test automation service to cause generation of a test case outline, wherein the test case outline is characterized by at least the one or more preconditions associated with the first test case node and the one or more step-expectation maps associated with the first test case node.

6. The method of claim 5, wherein the standardized test case information is output to the test automation service to further cause generation of executable instructions corresponding to the one or more preconditions associated with the first test case node and the one or more step-expectation maps associated with the first test case node, wherein the test case outline comprises the executable instructions.

7. The method of claim 1, wherein at least one node of the plurality of nodes comprises a tag, wherein the tag comprises textual information.

8. The method of claim 7, wherein generating the standardized test case information is based on the tag, the tag corresponding to a constraint on the test case specification.

9. The method of claim 7, wherein the tag is selected from a plurality of predefined tags.

10. The method of claim 7, further comprising receiving, from the GUI, an indication of a custom tag textual information, wherein the tag is based on the custom tag textual information.

11. The method of claim 1, wherein the data structure is based on JavaScript Object Notation (JSON).

12. The method of claim 1, wherein the graphical user interface (GUI) is based on the KityMinder Core open source project.

13. The method of claim 1, wherein the graphical user interface (GUI) is based on the AgileTC open source project.

14. The method of claim 1, wherein the standardized test case information is based on the OpenAPI specification.

15. A non-transitory computer-readable medium storing instructions that, when executed by one or more processors, cause the one or more processors to perform operations including:
receiving, from a graphical user interface (GUI), a test case specification, comprising a graph comprising a plurality of nodes, wherein at least one pair of nodes are connected by an edge; receiving, from the GUI, a designation of a first node as a first test case node;
receiving, from the GUI, one or more preconditions associated with the first test case node;
receiving, from the GUI, one or more step-expectation maps associated with the first test case node;
generating standardized test case information comprising the test case specification, the one or more preconditions, and the one or more step-expectation maps, comprising:
generating a representation of the test case specification, comprising a structure portion and a style portion;
generating an image of the test case specification; and
generating the standardized test case information, wherein:

the generated standardized test case information includes a data structure including the representation and the image; and generating the standardized test case information based on a test case specification standard of a test automation service; and outputting the standardized test case information.

16. The non-transitory computer-readable medium of claim 15, wherein the plurality of nodes comprises
at least one top-level node, comprising:
at least one section node, comprising one or more test case nodes; and
at least one test case node, wherein each test case node comprises one or more associated preconditions and one or more associated step-expectation maps.

17. The non-transitory computer-readable medium of claim 15, wherein at least one node of the plurality of nodes comprises a tag, wherein the tag is a label that characterizes the node.

18. A system comprising:
one or more processors; and
one or more computer-readable storage media storing instructions which, when executed by the one or more processors, cause the one or more processors to perform operations including:
receiving, from a graphical user interface (GUI), a test case specification, comprising a graph comprising a plurality of nodes, wherein at least one pair of nodes are connected by an edge;
receiving, from the GUI, a designation of a first node as a first test case node; receiving, from the GUI, one or more preconditions associated with the first test case node;
receiving, from the GUI, one or more step-expectation maps associated with the first test case node;
generating standardized test case information comprising the test case specification, the one or more preconditions, and the one or more step-expectation maps, comprising:
generating a representation of the test case specification, comprising a structure portion and a style portion;
generating an image of the test case specification; and
generating the standardized test case information, wherein:
the generated standardized test case information includes a data structure including the representation and the image; and
generating the standardized test case information based on a test case specification standard of a test automation service; and
outputting the standardized test case information.

19. The system of claim 18, wherein the plurality of nodes comprises
at least one top-level node, comprising
at least one section node, comprising
at least one test case node, each test case node comprising:
one or more tags;
one or more associated preconditions; and
one or more associated step-expectation maps, wherein:
each step-expectation map comprises:
at least one step description; and
at least one expectation description, each expectation description mapped to at least one step description; and
each precondition comprises at least one precondition description.

20. The system of claim 19, wherein:
each tag is a label that characterizes the test case node; and
the one or more tags include a case type tag or a case priority tag.

* * * * *